United States Patent [19]
Ertl

[11] 3,893,450
[45] July 8, 1975

[54] METHOD AND APPARATUS FOR BRAIN WAVEFORM EXAMINATION

[76] Inventor: John P. Ertl, 15 Linden Ter., Ottawa, Canada

[22] Filed: Oct. 9, 1973

[21] Appl. No.: 404,669

[52] U.S. Cl............................................. 128/2.1 B
[51] Int. Cl............................................... A61b 5/04
[58] Field of Search ............................... 128/2.1 B

[56] References Cited
UNITED STATES PATENTS

| | | | |
|---|---|---|---|
| 3,032,029 | 5/1962 | Cunningham | 128/2.1 B |
| 3,087,487 | 4/1963 | Clynes | 128/2.1 B |
| 3,498,287 | 3/1970 | Ertl | 128/2.1 B |
| 3,696,808 | 10/1972 | Roy et al. | 128/2.1 B |

OTHER PUBLICATIONS
Davis, "Transactions of IRE on Medical Electronics" Vol. RGME-11, July 1958, pp. 29–34.
Marsoner et al., "Medical & Biological Engineering," Vol. 8, No. 4, July 1970, pp. 415–418.

*Primary Examiner*—William E. Kamm
*Attorney, Agent, or Firm*—R. William Wray

[57] ABSTRACT

A method and apparatus for examining the brain waveform of a subject, for example in a type of electro-encephalography (EEG), by providing a stimuli, such as a light, and determining a characteristic of a mathematically determinable point in the brain waveforms of the subject. A number of brain waveforms are obtained after successive stimuli and where the mathematically determinable point is the zero crossing point, the time intervals to the second and third falling zero crossings in the brain waveform are considered to provide average values which are identified as the "A score" and the "B score" respectively and are utilized to indicate the condition of the subject. A closed loop feedback path may be used for stimulation of the subject.

8 Claims, 5 Drawing Figures

METHOD AND APPARATUS FOR BRAIN WAVEFORM EXAMINATION

BACKGROUND AND NATURE OF THE INVENTION

This invention relates to a method and apparatus for determining the response of a subject to an external stimulus, for example, a video or sound stimulus. I have previously proposed the use of evoked potentials for determining the response of a subject in brain wave analysis or electro-encephalographs (EEG) — see my U.S. Pat. No. 3,498,287 (issued Mar. 3, 1970) in which the information obtained was then used in assessing human intelligence.

During my work on the evoked responses of different subjects, I have established a statistically weak relationship between human intelligence as measured by IQ tests and various parameters of the electrical activity of the brain and I now believe that there are four general problems in attempting to use brain wave data to measure human intelligence:

a. The nature of human intelligence is poorly understood and its measure via IQ tests relies on a circular definition, i.e., that intelligence is a score on an IQ test.

b. Brain wave data sensed from the surface of the head are reflections of a large number of microscopic processes going on within the brain. Significant information concerning these processes is difficult to analyze and extract by conventional signal processing techniques.

c. Methods of sensory stimulation of the brain are critical in terms of understanding the underlying information processing activity within the matrix of brain cells.

d. There are a number of artefacts which impede the measurement of brain responses to stimulation. Some of these artefacts are of a physiological nature, whilst others are concerned with technological limitations of measurement and still others are due to electrical interference from the environment in which the subject is tested.

From one aspect, it is an object of the present invention to provide a method of determining the response of a subject to an external stimulus in which difficulties arising from the above-identified problems are substantially reduced or obviated.

Accordingly, the present invention provides a method of determining the response of a subject to an external stimulus including the steps of: positioning detection means in relation to a subject so as to detect the electrical activity of the brain of the subject; positioning a source of stimulation in an operative position in relation to the subject; providing control means for causing said source to be activated a number of times in succession to provide a plurality of subject stimuli; obtaining the resultant electrical activity by means of said detection means; generating a plurality of successive pulses, spaced from each other in time whereby each is capable of being effective to cause said source to be activated to produce an individual resultant brain waveform in said electrical activity; determining the passage of each of said resultant brain waveforms through at least one particular selected mathematically determinable point; determining a characteristic of said particular selected mathematically determinable point in the respective resultant brain waveform; and utilizing said brain waveform to provide an indication of the condition of the subject.

From another aspect of the present invention, it is an object to provide apparatus for determining the response of a subject to an external stimulus in which the inaccuracies of the above-identified problems are substantially reduced or obviated.

Accordingly, the present invention provides apparatus for determining the response of a subject to an external stimulus including detection means capable of being so positioned in relation to a subject as to be able to detect the electrical activity of the brain; a source of stimulation adapted to be positioned in an operative position in relation to the subject; control means for causing said source to be activated a number of times in succession to provide a plurality of patient stimuli; electrical connections to said detection means for obtaining the resultant electrical activity; pulse generating means capable of cooperating with said control means and for generating a plurality of successive pulses, spaced from each other in time whereby each is effective to cause said source to be activated to produce an individual resultant brain waveform in said electrical activity; first determining means for determining the passage of each of said resultant brain waveforms through at least one particular selected mathematically determinable point; characteristic determining means for determining a characteristic of said particular selected mathematically determinable point in the respective resultant brain waveform; and utilization means for utilizing said brain waveform to provide an indication of the condition of the subject.

The expression "mathematically determinable point," as used in the present specification, will be understood to mean any point on a waveform which can be mathematically determined. The major points are, of course, the maximum point, the minimum point and the zero crossing points of the waveform. So far as EEG is concerned, mathematically determinable point may be regarded as any time-voltage co-ordinate either of the basic EEG or the amplitude average known as the evoked response following any method of sensory stimulation, such as photic, audatory, tactile, odorous or gustatory, — any mathematical combination of the above-defined mathematical points may be used to improve the prediction of intelligence and/or IQ from brain-wave analysis. For example, step-wise multiple regression analysis.

DRAWINGS

An embodiment of the present invention will now be described, by way of example, with reference to its application to brain wave analysis or electro-encephalography (EEG).

In the accompanying drawings:

FIG. 1 is a diagrammatic representation of apparatus for brain wave analysis,

FIGS. 2A and 2B when located side by side show a more detailed diagrammatic representation in block form of apparatus according to the present invention, FIG. 3 is a graphical representation of a preliminary estimate for a correction factor applicable to a reading used in the present invention, and FIG. 4 is a graphical representation of operation of an embodiment of the invention utilizing a closed loop feedback stimulation method.

DETAILED DESCRIPTION

Figure 1:
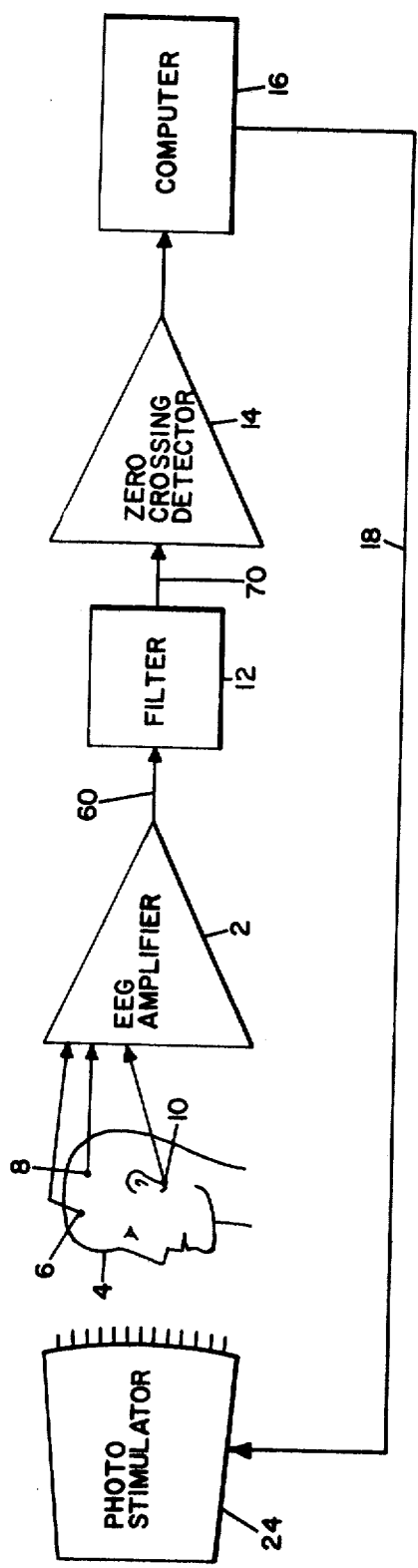

Referring to FIG. 1, there is shown an analyzer system according to the present invention comprising an EEG amplifier 2 adapted to receive brain waves from the head 4 of a subject by way of an anterior electrode 6, a posterior electrode 8 and an ear-clip electrode 10 connected to the head of a subject, and by way of electrical connections between said electrodes and the EEG amplifier. An EEG cap of molded pliable rubber may be used in which disposable electrodes can be placed to make contact with the scalp. The electrical activity of the brain is thus detected by the electrodes which are normally placed on the scalp over the motor cortex ($C_4$ in the international 10-20 system) of the subject. The EEG amplifier 2 is such that it amplifies the electrical signals from the brain by a factor of approximately 20,000 using conventional differential EEG amplifiers.

Figure 4:
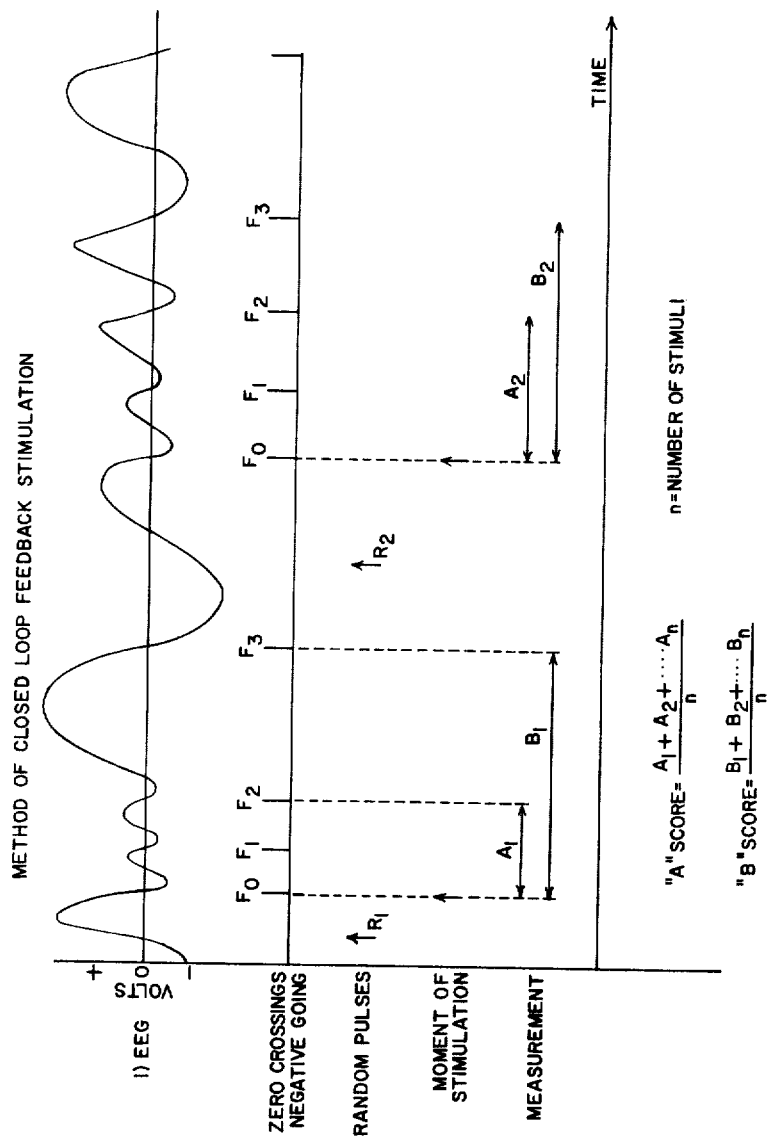

The output of the EEG amplifier 2 is fed to a filter unit 12 having 3 db points at 3 and 50 Hertz and an attenuation slope of 24 db per octave. Such filtering improves the signal-to-noise ratio and it is found that most of the relevant information in the EEG is contained in the narrow band of frequencies ranging from three to fifty cycles whereby band pass filtering is permissible. The output of the filter unit 12 is fed to a zero crossing detector unit 14 capable of producing pulses corresponding to the instant at which the voltage of the EEG waveform changes between negative to positive or positive to negative. The output of the zero crossing detector unit 14 is fed to a computer unit 16 adapted to control a photo-stimulator unit 24, by way of a trigger pulse along line 18, in a manner known as closed-loop feedback stimulation as illustrated in FIG. 4. Photo-stimulator unit 24 comprises a source of illumination positioned before the eyes of the subject 4. Thus a control signal along connection 18 causes the photo-stimulator unit to be activated to produce illuminating light whereby a stimulus is provided for the subject 4 to initiate generation of an EEG waveform.

Figure 2A:
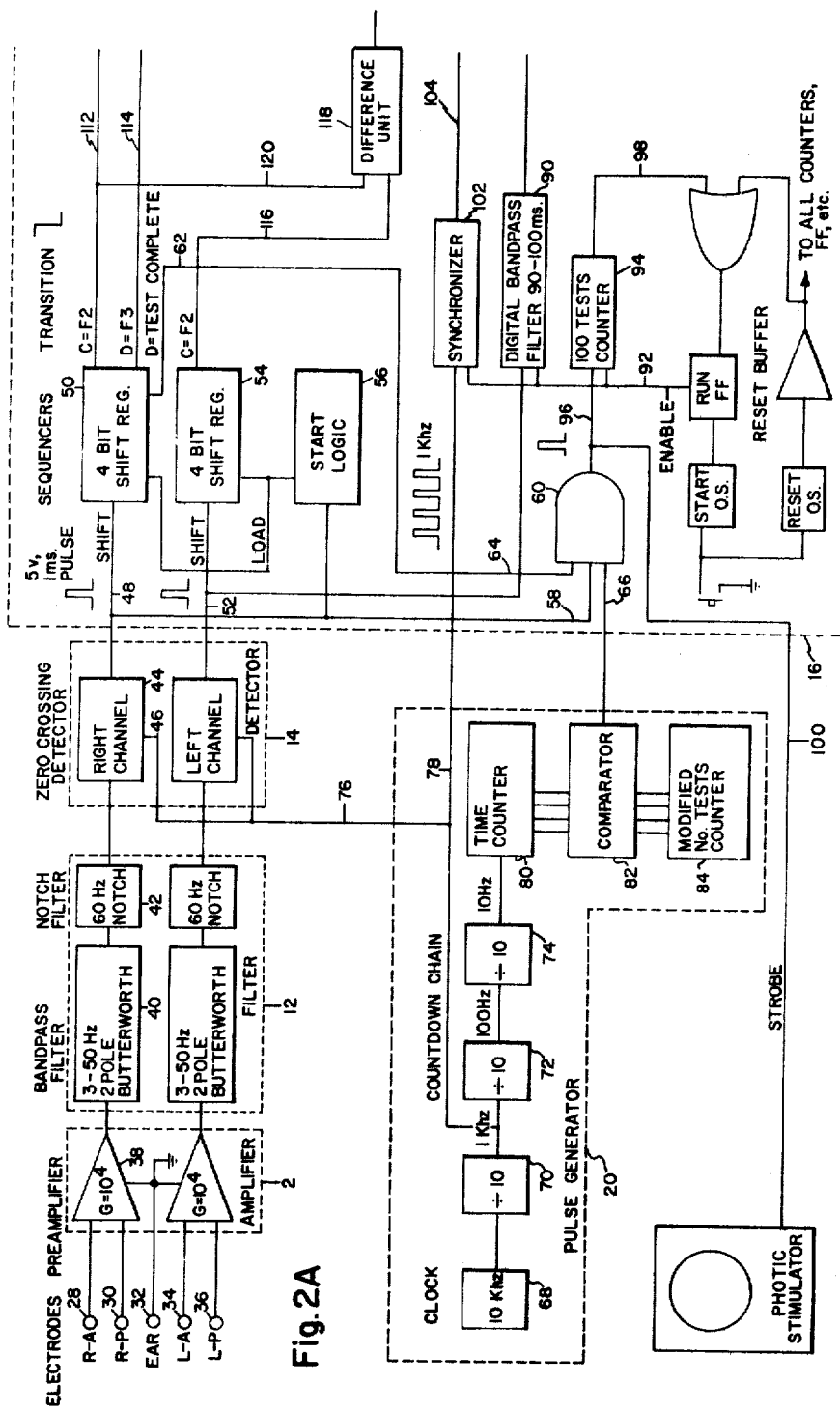
Figure 2B:
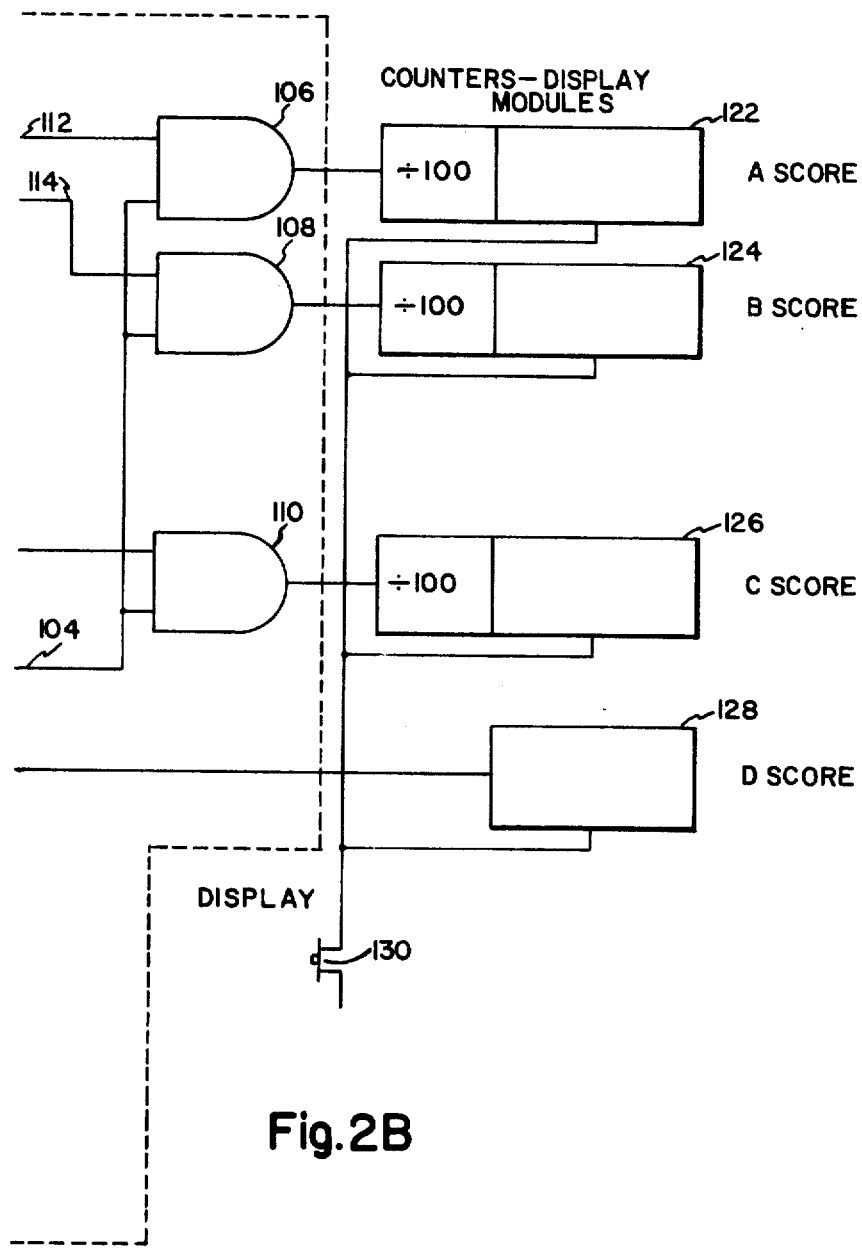

In FIGS. 2A and 2B, a more detailed representation of an embodiment according to the present invention is illustrated, the same reference numerals being applied to items in FIGS. 2A and 2B as were used for the corresponding items in FIG. 1 even though FIGS. 2A and 2B may well represent an improvement over a detailed embodiment which could fall within the general block schematic of FIG. 1.

The scalp electrodes 28, 30, 32, 34 and 36 are identified as R-A, R-P, ear, L-A, and L-P. The ear electrode 32 is effectively a reference electrode whilst the electrodes 28 and 30 are concerned with the right hemisphere of the brain whilst the electrodes 34 and 36 are concerned with the left hemisphere of the brain. The waveform on each pair of electrodes 28, 30 or 34, 36 are fed through similar channels and it will be seen that the right waveform on electrodes 28, 30 first of all passes through the EEG amplifier unit 2 and specifically passes through an amplifier 38 having a gain of $10^4$. It then passes through a band pass filter 40 which may conveniently be a two pole Butterworth filter having a band-pass between 3 Hertz and 50 Hertz. The output of the filter 40 is then fed through a 60 Hertz notch filter 42 and the amplifier and associated filters thus provide a high impedance, instrumentation amplifier system with a very high common mode rejection ratio. The response of the amplifiers is thus band limited and as will be apparent, shall approach that of a four pole low pass filter at 50 Hertz and a three pole high pass filter at 3 Hertz. The IQ notch filter implements a 60 Hertz rejection.

After passing through the filter unit 12 the signal from the right hemisphere of the brain passes through a right channel zero crossing detector 44 within detector unit 14. The right channel zero crossing detector 44 receives timing pulses on connection 46 in a manner to be explained below whilst its output is fed along connection 48 as a 5 volt 1 millisecond pulse to the input of a sequencer unit which is a four bit shift register 50.

As will be clear from FIG. 2A, the brain waveform from the left hemisphere is fed through a similar chain comprising an EEG amplifier, a 3–50 Hertz filter, a notch filter, and a left channel zero crossing detector along a connection 52 to a four bit shift register 54. A start logic control unit 56 is provided and receives a pulse from connection 48 on the interconnections as shown and then provides the appropriate start pulses to the shift registers 50 and 54. The 5 volt 1 millisecond pulse on connection 48 from the right channel zero corssing detector 44 is also fed along connection 58 to one input of a three input gate unit 60. An inverse output (test complete) is obtained on connection 62 from the four bit shift register 50 and is fed to another input 64 of gate 60. The third input 66 of gate 60 receives timing pulses from the pulse generator unit 20.

As shown in FIG. 2A the pulse generator unit 20 includes a 10 kilohertz clock pulse generator unit 68. The clock pulses from generator unit 68 are successively divided by ten in successive units 70, 72 and 74 comprising a countdown chain. One kilohertz clock pulses are provided along connection 76 to the right channel zero crossing detector 44 and the left channel zero crossing detector. These pulses are also provided along connection 78. The 10 Hertz output from unit 74 is fed to a time counter unit 80 which provides a four line input to a comparator unit 82 which also receives a second four line input from a modified number test counter, identified as 84 in FIG. 2. The four bit comparator unit 82 in conjunction with the two identical counters 80 and 84 comprise a random pulse generator. The 10 Hertz (100 ms) signal is thus applied to the random pulse generator whose output from the comparator unit 82 is fed along connection 66 to gate 60 and that output goes high whenever both four bit inputs to the comparator are equal. As will be appreciated, the master clock pulse unit 68 can conveniently be a simple Schmitt trigger multivibrator circuit with an accuracy of approximately 2 per cent.

A quasi-random sequence of known characteristics may be generated by modifying the sequence of counting of the counter unit 84.

One feature of the embodiment of this invention is that a measure is made of how much alpha ($\alpha$) waves a subject is generating during a particular test. This is accomplishing by counting the number of events in which two falling zero crossings occur with a period in the range of 90 to 120 ms (i.e. $f = 9.1 \rightarrow 12.5$ hz). Optionally, 20 $\rightarrow$ 120 ms (i.e. $f = 8.3 \rightarrow 12.5$ hz) may be selected. This is accomplished in FIG. 2A with a digital band pass filter unit 90 consisting of a counter which measures the interval (period) between zero crossings and increments the alpha counter whenever any period falls within the selected range. The digital band pass filter 90 receives one output from the left channel zero crossing detector unit along connection 52. It also receives an enabling input from connection 92.

Implementation of the filter 90 requires one S7290N BCD counter, one S7292N/12 counter, one S7210N flip flop for an enable count latch and supplemental gating to allow each falling zero crossing of proper period to be counted during testing.

The circuitry required to provide the enabling pulses on connection 92 will be apparent to one skilled in the art from the diagrammatic representation reproduced in FIGS. 2A and 2B. It is to be noted that a 100 test counter 94 is also provided and besides receiving the enabling pulse on connection 92 receives an output pulse from gate 60 on connection 96. It provides an output along connection 98 back to the enabling circuit.

A strobe control pulse is also obtained from gate 60 and fed along connection 100 to the photic-stimulator unit 24 (FIGS. 1 and 2A).

A synchronizer unit 102 receives the enabling pulse from connection 92 and also receives a 1 kilohertz pulse train on connection 78 from the countdown unit 70. Thus, gating pulses are provided along connection 104 to gating stages 106, 108 and 110. The second input of gate unit 106 receives an output from shift register 50 via connection 112 which corresponds to the second falling zero crossing whilst the second input of 108 receives pulses on connection 114 corresponding to the third falling zero crossing of the brain waveform from the right hemisphere of the subject's brain.

The shift register 54 provides an output on connection 116 corresponding to the second falling zero crossing in the brain waveform response of the subject under test and this output is supplied along a connection 116 to a first input of a difference unit 118 which receives at its second input along connection 120 the waveform representative of the second falling zero crossing from the right hemisphere of the subject's brain, i.e. from shift register unit 50. An output from the difference unit 118 is fed to the second input of the gate unit 110.

To the right of FIGS. 2B, the final counters and display modules are diagrammatically illustrated. As will be clear from the description below, four significant calculations or readings are derived from the responses of the subject and are utilized according to the present embodiment to derive significant information. These are identified as "A Score," "B Score," "C Score," and "D Score."

Referring to FIGS. 2B, the output of gate 106 is fed to a counter and display module 122 which is concerned with the "A Score." Unit 122 includes a "divide by 100" counter at its input whereby the average is taken of 100 lapsed time measurements made sequentially after the system has been placed in the "run mode."

The output of gate 108 corresponds to the third falling zero crossing ($F_3$) in the same way as the output of gate 106 corresponds to the second falling zero crossing ($F_2$) and this output of 108 is fed to a counter and display module 124 which is particularly concerned with the "B Score." That unit 124 again has a "divide by 100" counter at its input to take the average of 100 lapsed time measurements.

In order to display the difference between the second falling zero crossings from the right and left channels, the output of gate 110 is fed to the input of a further counter and display module 126 having a "divide by 100" counter at its input. This unit is particularly concerned with "C Score."

The output of the digital band pass filter 90 (representing the alpha score) is supplied to a display module 128 which is particulary concerned with the "D Score." It will furthermore be observed that a display control 130 is provided in association with each of the counter-display modules.

In operation the embodiment of FIGS. 2A and 2B operates to provide a measure of the time of occurrence of the second and third "falling zero crossings" which occur in the right hemisphere (master) channel 44 following the occurrence of an excitation signal which is generated by the instant analyzer device of the photic-stimulator unit 24.

As will be seen, the master, or right, channel determines the second and third "falling zero crossings" ($F_2$ and $F_3$) which are determined as the average of 100 elapsed time measurements made sequentially after the analyzer system has been placed in the "run" mode. In the slave channel, i.e. the left channel, associated with channels 34 and 36, the analyzer unit system completes the average of the absolute-value time differences in the $F_2$ times of the master and slave channels. This slave channel also has the capability of accumulating the total number of times in which the slave channel system has a period within two prescribed time intervals. Normally these time intervals are the equivalent of an 8 Herz and 12 Herz signal (alpha). These latter counts shall likewise be inhibited during the "hold" state.

The generation of an excitation signal by the photic-stimulator 24 is the result of the occurrence of three events. The first is the lapse of a time interval from the previous master channel $F_2$ event. This time shall be determined from the occurrence of an equal comparison of the unit 80 "number of tests" counter 64 which has been decoded into a quasi-random sequence of numbers as follows: 13, 5, 9, 5, 15, 7, 11, 7, 12, 4, 8, 4, 14, 6, 10, 6, and a lapsed time counter which counts in intervals of 100 milliseconds. The second required event is the occurrence of a falling zero crossing of the input signal whilst the third condition is that the prior test has been completed.

On the front panel of the analyzer system illustrated in FIGS. 2A and 2B, conveniently there shall be provided a single numeric readout so as to display, by switch selection, the average value $F_2$ from the A score unit 122, and the $F_3$ times from the B score unit 124, the average absolute value difference of $F_2$ falling zero crossings from the right and left channels appearing at the display module 126 representative of the C score, and the number of alpha event counts, representing the D score, appearing at display unit 128. The latter count is displayed if no other display is selected.

Additional capability may be provided to display on a cathode ray tube, at a wide variety of sweep rates, the input signals to both channels of two separate "traces." These signals may be displayed in a "chopped" mode so that proper time alignment of the channels can be viewed. Commonly available controls for horizontal and vertical positioning of the traces and for trace amplitude may be provided.

By using the embodiment of FIGS. 2A and 2B, it is believed that an improved testing of the subject can be achieved. Conventional tests of intelligence (IQ tests) measure what has already been learned and not the potential to learn. It is of interest to educators and society in general to assess the learning potential and efficiency of an individual. The described embodiment is not concerned with demonstrating a high degree of relationship with IQ tests. Instead, it provides a means whereby the general level of consciousness and the biological or physiological efficiency of a person's (or animal's) brain may be measured. Efficiency in this context refers to the speed with which information is processed within the brain, and can be defined by way of example as follows: Given two information processing systems of the same capacity, the one that processes more information per unit time is considered more efficient. Numerous studies have shown that in all cases where the level of human consciousness is lowered by means of drugs, such as alcohol, tranquilizers, anaesthetics, or by metabolic disturbances, such as thyroid deficiency, the pattern of brain waves in response to sensory stimulation is changed. The embodiment of FIGS. 2A and 2B is particularly suitable for measuring such changes.

It has been shown that the activity of single cells in the brain is highly correlated with the gross activity detected by electrodes on the surface of the head. These potentials are, however, contaminated by numerous intervening variables so that it is difficult to isolate the specific response of the brain to a specific sensory stimulus. The variables which contribute to reducing the signal to noise ratio are of two classes — internal and external. Internal variables are, for example, the alpha rhythm which is a name for a frequency band of between 8 and 12 Hz of activity within the brain, generally present in healthy subjects during relaxed states and most prominent over the occipital area of the brain, the thickness of the skull, the conductivity of the various tissues intervening between the source of the electrical activity and the area of contact on the scalp also artificially modify brain wave patterns with respect to their amplitude and phase relationships. External factors consist mainly of interference from electrical apparatus in the vicinity of the subject, or poor contacts with the scalp, or inappropriate designs in the amplifier required to detect brain waves.

There are innumerable methods of stimulation in terms of stimulus patterns, intensities, sense modalities and combinations of all these. The desired embodiment provides for the essential feature that whatever the sensory stimulus may be it should be presented in such a manner that the moment of stimulus presentation coincides and is determined by certain characteristics of the brain wave pattern of the person under test, i.e. a closed feedback loop exists between the subject and the stimulating apparatus.

While there is controversy as to the nature of the origin of the alpha rhythm, for purposes of the described embodiment, the alpha rhythm is considered as an artefact which interferes with the proper measurement of the neutral efficiency of the brain. Since the frequency of the alpha rhythm is within the significant signal band-width it cannot be filtered out electronically without affecting the stimulus evoked response signal of interest. The embodiments therefore provides for a means of measuring the amount of alpha rhythm present and provides a correction factor based on theoretical empirical evidence to derive the true neural efficiency score of an individual. In addition to the above-mentioned factors, another important variable must be considered in the final determination of the neural efficiency score of an individual. It has been shown that in normal individuals the two hemispheres of the brain are well synchronized and that in persons suffering from various forms of learning disabilities, brain tumors, or minimal brain dysfunction, the synchronization is disturbed. In the embodiment of FIGS. 2A and 2B, it is believed possible to measure the degree of synchronization of the electrical activity between the two hemispheres of the brain.

The analyzer apparatus of FIGS. 2A and 2B produces four numerical scores from units 122, 124, 126 and 128, labelled A, B, C and D, which, when combined in an appropriate manner, will yield a reasonably accurate estimate of a person's neural efficiency, ability or potential to learn. The four measurements produced by the apparatus of this invention are:

The A Score from unit 122 represents the average time interval of the second zero crossing in response to a plurality of sensory stimuli administered in a specified manner.

The B Score from unit 124 represents the average time interval of the third zero crossing in response to a plurality of sensory stimuli administered in a specified manner.

The C Score from unit 126 represents the average of the absolute value of the differences between the latency of the second zero crossing derived from the left and right hemisphere responses to a plurality of sensory stimuli administered in a specified manner.

The D Score from unit 128 represents the percentage of time that alpha rhythm is present during the test.

Score A and B represent the basic uncorrected response time of the brain to sensory stimulation. The second and third zero crossing latencies were chosen because the first zero crossing is too short to differentiate among persons and because it represents only simple perceptual processes. The latency of the second and third zero crossings represent a later and more complex stage in the information processing of the brain. These two latencies are therefore more closely related to a measure of the efficiency of the brain. Responses occurring after the third zero crossing also have significance, but of considerable less importance.

The C Score indicates the synchronization of information transfer between the two halves of the brain and is known as the "hemispherical assymetry score." Extensive testing of subjects with clearly diagnosed learning disabilities such as dyslexia, has shown that "hemispherical assymetry score" was significantly greater for these subjects than for a control group of normal subjects. Thus the C score must be clinically evaluated in relation to the other three scores obtained.

Figure 3:
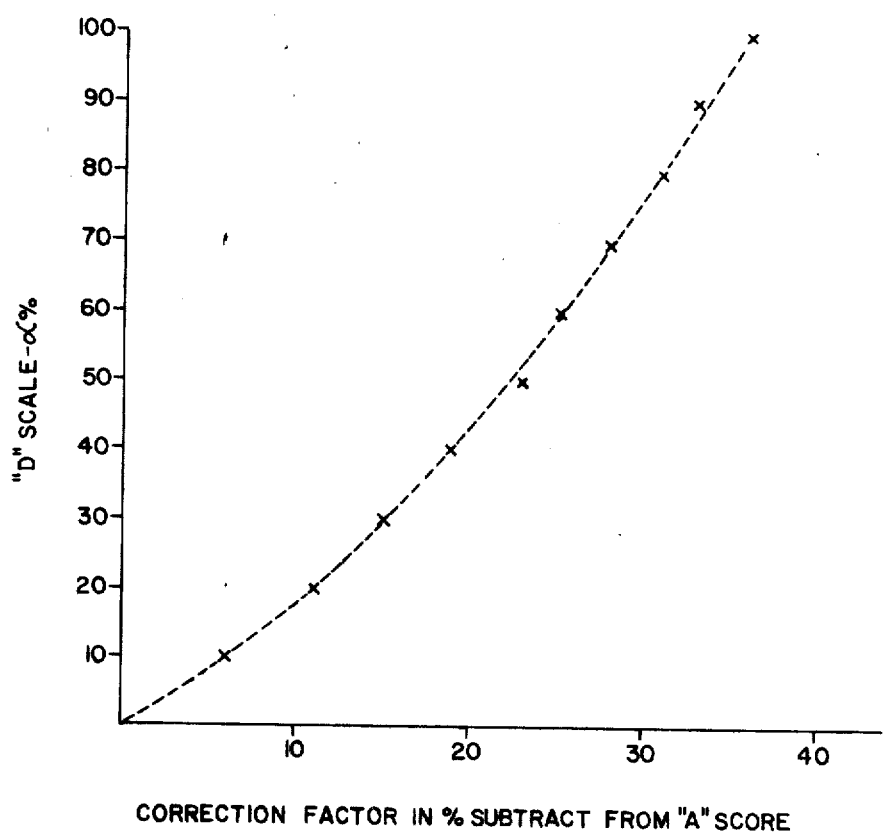

Score D is necessary to correct scores A and B, because the alpha rhythm may not be a true reflection of brain activity during stimulation and it tends to reduce the true efficiency score. The amount of this correction factor can best be determined by experiment with a large number of subjects. A preliminary estimate of this correction factor is shown in FIG. 3. The effect of this correction factor is to yield a neural efficiency score for each individual as though the alpha interference were not present.

Unfortunately, the evoked response may be in the band of frequencies represented by the alpha rhythm (8 – 12 Hz), and this would generally be true of subjects with lower intelligence. The correction factor illustrated in FIG. 3 would in such cases be too much to overcome this problem; advantage can be taken of the fact that the true alpha rhythm is a highly sinusoidal component (cycle to cycle frequency variation less than 2%) while the evoked response is not sinusoidal and has considerable cycle to cycle frequency variation. Thus the ratio B/A : 2/3 should be close to 1 for any sine wave. Any deviation from 1 would indicate that the response is not sinusoidal and likely to be a true evoked response. This ratio (R) is used to correct the alpha correction factor (D score). An appropriate value of this correction factor is $(1-R)^n \times 100$. The scoring procedure at the completion of the test when the four (A, B, C, D) scores have been produced would be as follows: First, apply the alpha correction factor to the A score, then correct this corrected score by the percentage indicated by the ratio score. The corrected neural efficiency score is then interpreted by reference to a table of norms obtained from a large sample of the population.

The interaction of these four scores and others that may be derived to produce the most accurate estimate of neural efficiency are difficult to compute mathematically but are easy to establish experimentally, and proper weights assigned to each score (A, B, C and D) yielding the most useful and accurate prediction of neural efficiency. Since there are maturational changes in the brain, the age of the subject under test is another factor that must be considered in evaluating the neural efficiency score. Based on large scale normative studies, weighting co-efficients could be, and are being developed to facilitate measurement and prediction of a large number of mental and physiological characteristics that are related to the neural efficiency of a person. The evaluation of drugs affecting the brain is another useful application of the neural efficiency score.

METHODS OF STIMULATION

There are several problems in comparing the evoked responses in different subjects which depend on the method of stimulation used and also on the nature of the evoked response.

a. The waveshape of the evoked response in a particular subject is not known a priori and thus responses immediately following stimulation could be either positive going or negative going, depending on the subject.

b. The response also depends on the nature of the EEG immediately preceding the stimulus; thus if the EEG tends to go positive it is likely to continue to be positive for some time and vice versa, and this influences the evoked response. In order to make different subjects comparable, it is essential to minimize the effects of the moment of stimulation and the effects of the nature of the EEG prior to stimulation.

In order to elicit an evoked response, I propose at least three basic methods of stimulus presentation:

1. Random stimulation — That is, the intervals between presentation of stimuli are not periodic. This tends to reduce the influence of the EEG preceding the stimuli.

2. Periodic stimulation — That is, the intervals between presentation of stimuli occur regularly at some fixed interval. This method is usable but not very effective.

3. Closed loop feedback stimulation — In this method, the subject's own brainwaves are used to generate stimuli. For example, stimuli can be generated each time a subject's brain waves reach some predetermined voltage level or the brain waves have some other mathematically definable characteristic. This method is the preferred method of the present invention and is illustrated in FIG. 4. It is, however, possible to obtain similar, but less accurate results using either random stimulation or periodic stimulation without closed loop feedback.

With reference to FIGS. 3 and 4, a plurality of time intervals to the second falling zero crossing are obtained, identified as $A_1, A_2 \ldots$ and the system then calculates the A score according to the formula:

$$A \text{ Score} = \frac{A_1 + A_2 \ldots \ldots A_n}{n}$$

where $n$ is the number of stimuli which are initiated. Thus, the A score is the average time interval to the second falling zero crossing.

Similarly, the value of the B score is calculated by the system of FIG. 2 whereby all the time intervals corresponding to successive falling zero crossings are measured and the B score is calculated according to the formula:

$$B \text{ Score} = \frac{B_1 + B_2 + \ldots \ldots B_n}{n}$$

where $n$ is the number of stimuli.

By obtaining the particular values of A, B, C and D scores for a subject I have found that it is possible to obtain a realistic value of the intelligence of the subject under test and useful information can be obtained from the system of analysis. Certain techniques are discussed in my U.S. Pat. No. 3,498,287 (issued Mar. 3, 1970) and the details therein are incorporated into the present application by reference.

It will be appreciated that the closed-loop feedback path of FIG. 4 permits the use of a mathematically determinable point of a subject's brain waveform to be used to control initiation of the moment of stimulation following random time intervals.

I claim:

1. A method of determining the response of a subject to an external stimulus including the steps of
   a. positioning detection means in relation to a subject and detecting the electrical activity of the brain of the subject, said brain activity comprising a plurality of brain waveforms,
   b. positioning a source of stimulation in an operative position in relation to the subject,
   c. providing control means for causing said source to be activated a number of times in succession to provid a plurality of subject stimuli,
   d. obtaining the resultant electrical activity by means of said detection means, e. determining the passage of each resultant brain waveform through at least one particular selected mathematically determinable point, f. determining a characteristic of said particular selected mathematically determinable point in the respective resultant brain waveform, g. obtaining the sum of said characteristic for said plurality of subject stimuli, h. effectively dividing said sum of characteristics by the number of said stimuli and providing an indication of the average value of said characteristic, i. wherein said characteristic is the time interval between activation of said course of stimulation and the second falling zero crossing of the brain waveform, said average value being identified as the A score of the subject, and including the steps of obtaining the sum of the time intervals from the activation of said source of stimulation and the third falling zero crossing and effectively dividing the latter sum by the number of stimuli to provide an average value of the third falling zero crossings identified as the B score, said A score and said B score being utilized to indicate the condition of the subject, and j. indicating the condition of the subject as represented by said A score and B score.

2. A method according to claim 1 wherein means for determining said characteristic in step (g) determines the characteristic of a plurality of said points in each resultant brain waveform.

3. A method according to claim 1 including the step of feeding signals back to said source each corresponding to a mathematically determinable point of the brain waveforms of the subject to control initiation of the moment of stimulation following random time intervals.

4. Apparatus for determining the response of a subject to an external stimulus including:

detection means capable of being so positioned in relation to a subject as to be able to detect the electrical activity of the brain, said brain activity comprising a plurality of brain waveforms, a source of stimulation adapted to be positioned in an operative position in relation to the subject, control means for causing said source to be activated a number of times in succession to provide a plurality of subject stimuli, pulse generating means electrically connected with said control means and for generating a plurality of successive pulses, spaced from each other in time and fed to said source to cause said source to be activated to produce an individual resultant brain waveform in said electrical activity, first determining means for determining the passage of each of said resultant brain waveforms through at least one particular selected mathematically determinable point, characteristic determining means for determining a characteristic of said particular selected mathematically determinable point in the respective resultant brain waveform, summation means for providing the sum of said characteristic for said plurality of subject stimuli, dividing means for effectively dividing said sum of characteristics by the number of said stimuli and providing an indication of the average value of said characteristic wherein said characteristic is the time interval between activation of said source of stimulation and the second falling zero crossing of the brain waveform, said average value being identified as the A score of the subject, said summation means obtaining the sum of the time intervals from the activation of said source of stimulation and the third falling zero crossing and effectively dividing the latter sum by the number of stimuli to provide an average value of the third falling zero crossings identified as the B score, and utilization means for utilizing said A score and said B score to indicate the condition of the subject.

5. Apparatus according to claim 4 wherein said characteristic determining means determines the characteristic of a plurality of said points in each resultant brain waveform.

6. Apparatus according to claim 4 including feedback means comprising a closed-loop feedback path to feed signals back to said source each corresponding to a mathematically determinable point of the brain waveforms of the subject to control initiation of the moment of stimulation following random time intervals.

7. A method of determining the response of a subject to an external stimulus including the steps of a. positioning detection means in relation to a subject and detecting the electrical activity of the brain of the subject, said electrical activity comprising a plurality of brain waveforms, b. obtaining the resultant electrical activity by means of said detection means, c. determining the passage of each of said brain waveform through at least one particular selected mathematically determinable point, d. determining a characteristic of a respective brain waveform at said particular selected mathematically determinable point in the respective brain waveform, e. obtaining the sum of said characteristic for said plurality of brain waveforms, f. effectively dividing said sum of characteristics by the number of said brain waveforms and providing an indication of the average value of said characteristic, g. wherein said characteristic is the time interval to the second falling zero crossing of the brain waveform, said average value being identified as the A score of the subject and including the steps of obtaining the sum of the time interval to the third falling zero crossing and effectively dividng the latter sum by the number of brain waveforms to provide an average value of the third falling zero crossings identified as the B score, said A score and said B score being utilized to indicate the condition of the subject, and h. indicating the condition of the subject as represented by said A score and B score.

8. Apparatus for determining the response of a subject to an external stimulus including:

detection means capable of being so positioned in relation to a subject as to be albe to detect the electrical activity of the brain, said brain activity comprising a plurality of brain waveforms, first determining means for determining the passage of each of said brain waveforms through at least one particular selected mathematically determinable point, characteristic determining means for determining a characteristic of a respective brain waveform at said particular selected mathematically determinable point in the respective brain waveform, summation means for providing the sum of said characteristic for said plurality of brain waveforms, and dividing means for effectively dividing said sum of characteristics by the number of said stimuli and providing an indication of the average value of said characteristic, wherein said characteristic is the time interval to the second falling zero crossing of the brain waveform, said average value being identified as the A score of the subject, said summation means obtaining the sum of the time interval to the third falling zero crossing and effectively dividing the latter sum by the number of brain waveforms to provide an average value of the third falling zero crossings identified as the B score, and utilization means for utilizing said A score and said B score to indicate the condition of the subject.

* * * * *